United States Patent [19]

Dunbar

[11] 4,249,633
[45] Feb. 10, 1981

[54] SCALE TESTING CART

[76] Inventor: Glenn G. Dunbar, 2608 Overbrook Dr., Toledo, Ohio 43614

[21] Appl. No.: 16,430

[22] Filed: Mar. 1, 1979

Related U.S. Application Data

[63] Continuation-in-part of Ser. No. 833,066, Sep. 14, 1977, abandoned, and a continuation-in-part of Ser. No. 931,995, Aug. 8, 1978, Pat. No. 4,211,297.

[51] Int. Cl.³ .................... B60K 9/00; B60K 17/10; G01G 23/00; B60P 3/00
[52] U.S. Cl. .................................. 180/306; 73/1 B; 180/24.02; 180/132; 180/312; 280/111; 280/682; 296/184
[58] Field of Search ................ 73/1 B; 180/252, 242, 180/253, 308, 306, 24.02; 280/111, 676, 1, 681, 682; 296/36, 184

[56] References Cited

U.S. PATENT DOCUMENTS

| | | | |
|---|---|---|---|
| 411,269 | 9/1889 | Taylor | 73/1 B |
| 3,014,734 | 12/1961 | Swenson | 280/111 |
| 3,154,164 | 10/1964 | Shaw et al. | 280/111 |
| 3,930,680 | 1/1976 | Littlefield | 296/36 |
| 4,048,843 | 9/1977 | Dunbar | 73/1 B |

*Primary Examiner*—Randolph A. Reese
*Assistant Examiner*—Donn McGiehan
*Attorney, Agent, or Firm*—Emch, Schaffer, Schaub & Todd Co.

[57] ABSTRACT

A scale testing cart for transporting and positioning weights to effect the calibration of a platform scale is disclosed. The cart includes a generally rectangular frame having a peripheral rail which retains a plurality of calibrated weight blocks, a front pair of wheels for steering, a rear pair of wheels for driving and braking and a hydraulic pump driven by a gasoline engine which supplies the power to effect the steering, driving and braking of the cart.

7 Claims, 6 Drawing Figures

U.S. Patent Feb. 10, 1981 Sheet 2 of 3 4,249,633
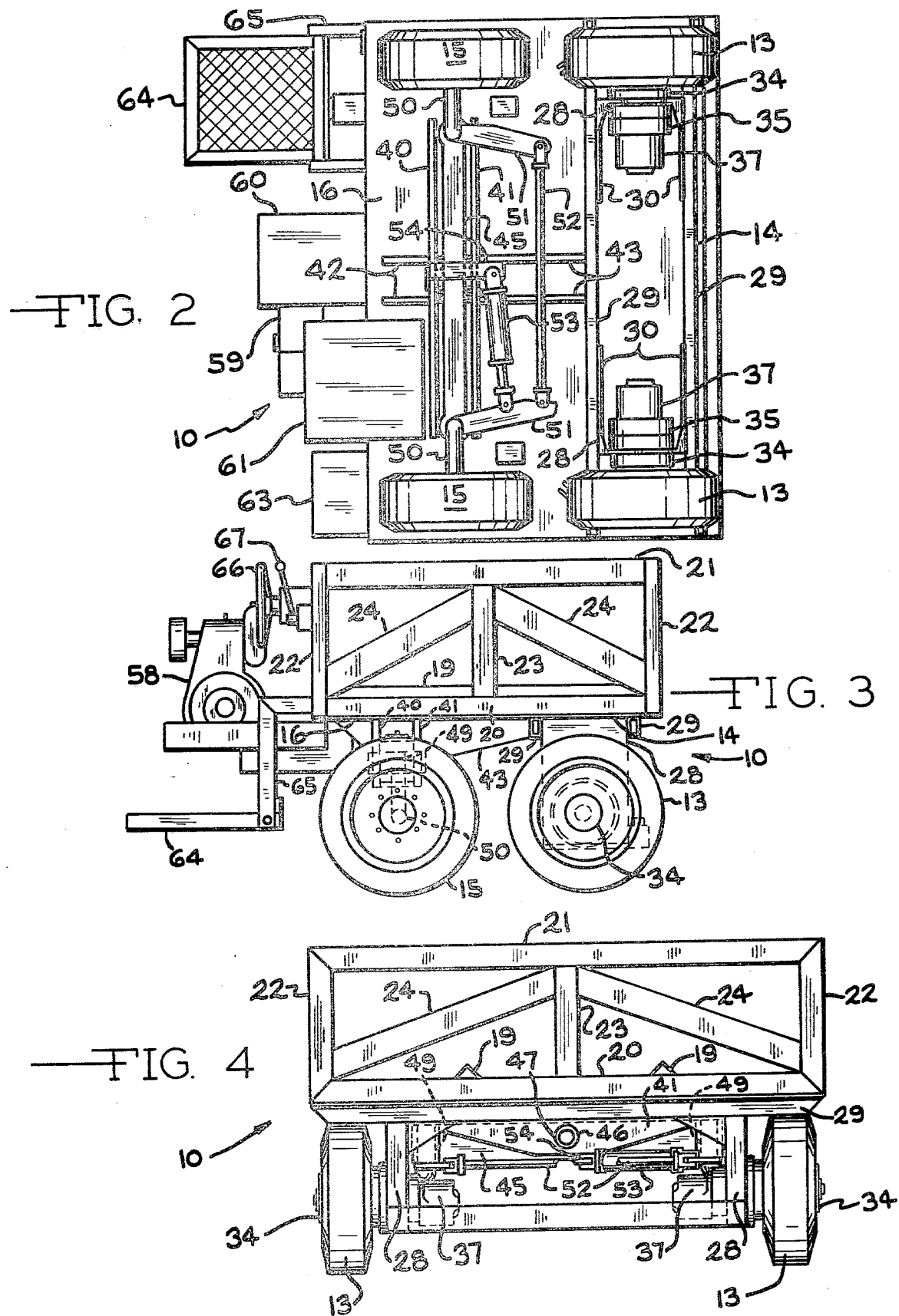

SCALE TESTING CART

CROSS REFERENCE TO RELATED APPLICATION

This is a continuation-in-part of my copending application Ser. No. 833,066, filed Sept. 14, 1977 entitled "Scale Testing Cart" now abandoned and a continuation-in-part of my copending application Ser. No. 931,995, filed Aug. 8, 1978 now U.S. Pat. No. 4,211,297 and entitled "Weight Vehicle Apparatus."

BACKGROUND OF THE INVENTION

The invention relates generally to a scale testing vehicle and more specifically to a self-powered cart adapted to transport calibrated weights, the total weight of the cart and weights being utilized to calibrate platform scales.

Platform scales are well known in the art and are utilized for many purposes. For example, platform type scales are used in commercial grain operations for measuring the amount of grain brought to an elevator. Similarly, governments utilize platform scales in their vehicle weight limit enforcement programs to determine whether semi-trailer and tractor units are complying with highway load limits.

The scales may be either mechanical or electronic scales. In either event, the scales often have a plurality of individual scale platforms, for example, a series of three platforms. By mechanical linkage or by electronic load cells, as a vehicle rests on one or more of the platforms, the vehicle is indicated by the scale.

It is not unusual for platform scales to measure vehicles and their loads weighing as high as twenty tons and in some cases, as high as one hundred tons. Dirt and friction have a tendency to build up at critical points in mechanical scale mechanisms and restrict action of the pivots. Winter ice also can restrict the action of a scale platform. When this occurs, the scales read a lower weight than the actual weight. Similarly, electrical drift in the components of electronic scales affects their calibration. In this case, the reading may be either above or below the proper weight. In either event, the consequences of inaccurate weight indication such as overpayment or underpayment for a load of grain or detention of a legally loaded vehicle are manifest.

Accordingly, the prior art has recognized for a long time that it is important to periodically calibrate platform scales. It also is known that the calibration accuracy of a scale will vary at different loadings. Therefore, calibration techniques established by state agencies often require platform scales to be calibrated at different loadings; the heaviest loading often double the scales' rate capacity.

In the past, platform scales were tested by placing different numbers of individual weight units, normally either five hundred pound units or one thousand pound units, upon the individual platform sections of a platform scale. It was not unusual to have two men spend a considerable amount of time unloading the weights from a vehicle which carried them to a scale site, testing the scale and reloading the weights back onto the vehicle.

One prior art solution involves a vehicle capable of concentrating its entire calibrated load on one section of a multi-section scale. The vehicle further includes a hydraulic crane which loads and unloads calibrated thousand pound weights from the vehicle onto a section of the scale, or onto a cart which is manually moved onto a a section of the scale, which requires individual testing or calibration at a lesser load. Even with this vehicle or prior art method, it has been laborious and time consuming to transport and position the calibrated weight on the scale section under test.

SUMMARY OF THE INVENTION

The present invention relates to an improved self propelled scale testing cart. A cart according to the present invention includes a generally rectangular weight receiving flat bed. The flat bed has a peripheral rail or truss structure which receives and retains a plurality of uniform weight units and also strengthens the flat bed. The cart further includes a front and rear pair of wheels, a hydraulic control system and a hydraulic pump powered by a gasoline engine. One pair of wheels rotates freely on stub axles which are pivotally mounted through steering knuckles to ends of a carrier which pivots about a horizontal central axis of the cart. The steering knuckles are positioned by a hydraulic cylinder to control the direction of travel of the cart. The two wheels of the other pair of wheels are independently mounted on the frame and are linked to fail-safe brakes, that is, normally engaged brakes, and to hydraulic gear motors. The simultaneous application of pressurized hydraulic fluid to the brakes and gear motors releases the brakes and causes the cart to move.

Should calibration of the individual sections of a platform scale be required, the testing cart, which for example weighs two thousand pounds, is loaded with as many calibrated one thousand pound weights as necessary up to a maximum of eighteen for a total loaded cart weight of twenty thousand pounds. The cart then is driven onto the various sections of the platform scale in order to determine the accuracy of each section. The calibration of the platform scale and its component sections is accomplished accurately, rapidly and efficiently.

Thus it is the object of this invention to provide improved means for the calibration at loadings substantially less than the maximum weight of platform scales having one or more sections.

It is a further object of this invention to provide for the transportation of the smaller loads from one section of the platform scales to another section.

It is a further object of this invention to provide for the rapid, safe and convenient calibration of platform scales.

BRIEF DESCRIPTION OF THE DRAWINGS

FIG. 2 is a bottom plan view of the scale testing cart of the present invention;

FIG. 3 is a side elevational view of the scale testing cart of the present invention;

FIG. 4 is a rear elevational view of the scale testing cart, according to the present invention;

DESCRIPTION OF THE PREFERRED EMBODIMENT

Figure 1:
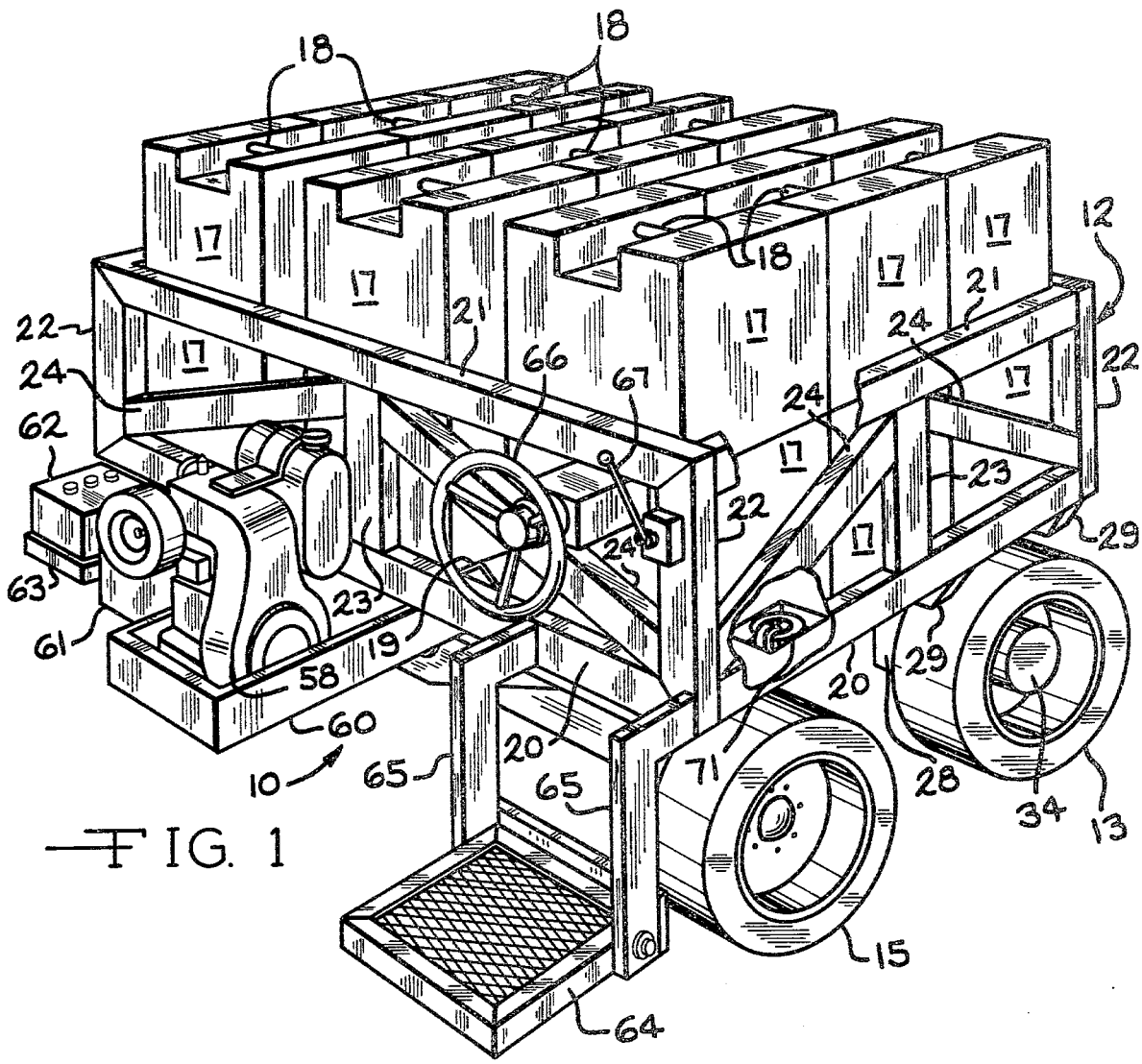
FIG. 1 is a perspective view of a scale testing cart, according to the present invention, showing two levels of weights in place on the cart and with the support and weight retaining rail or truss partially broken away.
Figure 5:
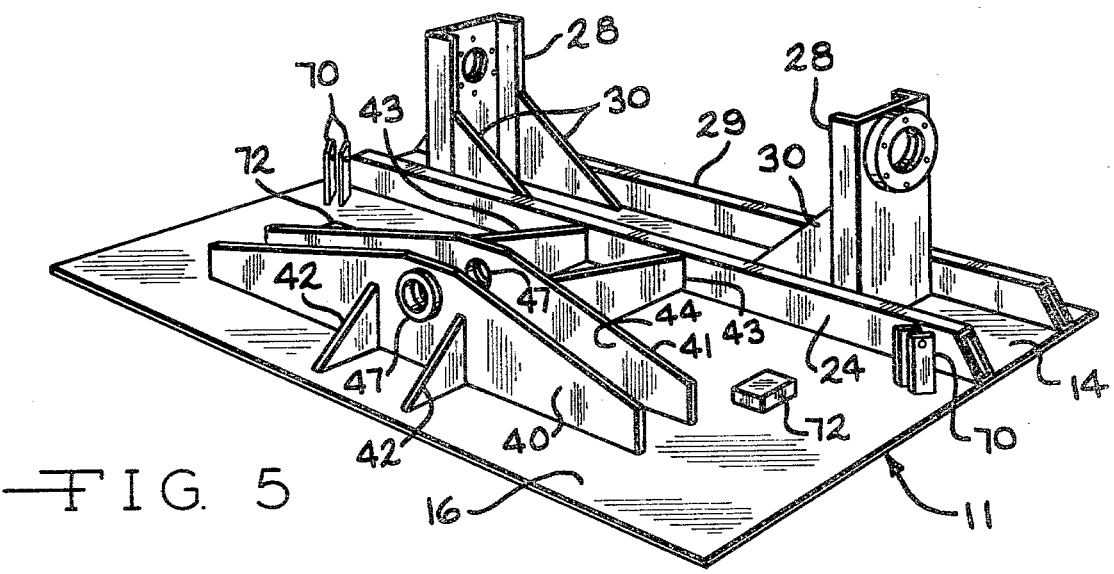
FIG. 5 is a perspective view of the bottom of the flat bed of the scale testing cart of FIG. 1.

Referring now to the drawings and particularly to FIGS. 1-4, a scale testing weight cart is shown and generally designated by the reference number 10. The weight cart 10 generally includes a flat bed 11 enclosed by an upwardly directed rail and truss structure 12 extending around its perimeter. A pair of driven wheels 13 are mounted below an end region 14 of the flat bed 11 and a pair dirigible wheels 15 are mounted below an opposite end region 16 of the flat bed 11.

The truss structure 12 serves a dual purpose. the truss structure 12 retains a plurality of calibrated weights 17 on the flat bed 11 of the cart 10. The calibrated weights 17 each include a horizontal handle 18 which facilitates lifting and transporting of the individual weights 17 with a suitable unloader. The weights 17 are arranged on the cart 10 in three longitudinal rows which are separated by pyramidal dividers 19. The dividers 19 extend the length of the cart 10. The transverse spacing between the fence 12 and the dividers 19 is such that the weights 17 properly seat therebetween only if the weights 17 and the handles 18 are uniformly aligned, as illustrated in FIG. 1. The alignment of the handles 18 facilitates rapid loading and unloading of the weights 17 from the cart 10. The weights 17 are designed to stack on top of each other and a second level of the weights 17 is shown positioned on top of a first level of the weights 17. The truss structure 12 is provided with sufficient height to retain the second level of weights 17 on the cart 10. In the illustrated embodiment of the cart 10, the weights are arranged in three rows. Each row is three weights long and two weights high, or contains a total of six weights, for a total of eighteen weights on the cart 10. By calibrating the weights 17 to exactly one thousand pounds each, the cart 10 will carry a total load of eighteen thousand pounds. The cart weight 10, exclusive of the weights 17, is adjusted to weigh exactly two thousand pounds so that the gross weight of the loaded cart 10 will be exactly twenty thousand pounds. The weight of the cart 10 can be decreased down to its minimum weight of two thousand pounds in one thousand pound increments by removing a desired number of the weights 17 from the cart 10.

In addition to retaining the weights 17 on the cart 10, the truss structure 12 is designed in the form of a truss which extends around and greatly reinforces the perimeter of the flat bed 11. The truss structure 12 includes a lower frame 20 which extends around and is welded to the perimeter of the flat bed 11. A similar upper rail 21 is spaced above the lower frame 20 and is held in place by four vertical corner posts 22 and four center posts or struts 23 which are positioned in the center of each side of the truss structure 12. In each side of the truss structure 12, reinforcement webs 24 also extend from the junction between the two corner posts 22 and the lower frame 20 to the junction between the center post 23 and the upper rail 21. The corner posts 22, center struts 23 and webs 24 are permanently welded together to form an extremely strong, rigid structure which greatly reinforces the periphery of the flat bed 11. As a consequence of using a truss structure 12, the undercarriage required to reinforce the flat bed 11 is minimized and, therefore, the cart 10 can be provided with an increased road clearance.

Referring now to FIGS. 2-5, details of the mountings for the wheels 13 and 15 are illustrated. A pair of U-shaped brackets 28 depend from the end region 14 of the flat bed 11 for mounting the two driven wheels 13. Channels 29 extend transversely across the bottom of the flat bed 11 on either side of the brackets 28 and are welded to the flat bed 11 and to the brackets 28. Additional reinforcement brackets 30 extending in a direction transverse the flat bed 11 are welded between the brackets 28 and the bed 11 to reinforce the brackets 28 against sideways movement. The driven wheels 13 are independently mounted through separate torque hubs 31 to the two brackets 28 below the cart bed 11. As best seen in the schematic hydraulic diagram of FIG. 6, each torque hub 31 has an outer stationary flange 32 attached to a bracket 28. Each hub 31 functions as a bearing through which a shaft 33 passes. Each torque hub 31 also includes a gear type speed reducer 34 with, for example, a reduction ratio on the order of 35:1. Such hubs are well known in the prior art and may be like or similar to the Model W1B hub manufactured by Fairfield Manufacturing Company.

The shafts 33 each extend inwardly from the torque hub 31 to a separate fail safe brake 35. The brakes 35 are normally engaged, that is, the application of a pressurized hydraulic fluid against a spring biased piston 36 in each brake 35 is necessary to release them. Such braking devices are well known in the art and a unit such as the Ausco Model 27798 or a similar unit may be employed to accomplish the braking function. The inward end of each shaft 33 is connected to a separate hydraulic gear motor 37. The shafts 33 rotate clockwise or counterclockwise in response to the direction of flow of hydraulic fluid through the gear motors 37. By selecting the direction of fluid flow, forward or reverse travel of the cart 10 is effected. In addition, the speed at which the cart 10 is propelled is controlled by controlling the fluid flow rate through the motors 37. The hydraulic gear motors 37 are well known in the prior art and units like or similar to the series M-30 motors manufactured by Borg-Warner may be utilized.

Turning to FIGS. 1-5, details are shown for the mounting of the dirigible wheels 15. Two parallel, spaced apart plates 40 and 41 are attached to the bottom of the flat bed 11 to extend a substantial distance across the opposite end region 16 of the bed 11. The plate 40 is reinforced with a pair of brackets 42 and the plate 41 is reinforced with a pair of brackets 43 which extend from the plate 41 to the channel 29. The plates 40 and 41 are oriented to define a spacing 44 which extends across the bed 11 and receives a carrier 45. The carrier 45 is pivotally attached to the brackets 40 and 41 by means of a shaft 46 which engages two coaxially aligned bearings 47 mounted on the plates 40 and 41. The bearings 47 are oriented coaxially with a horizontal central axis of the cart 10. The wheels 15 are attached through steering knuckles 48 to the ends of the carrier 45. Each steering knuckle 48 includes a bearing end 49 which pivotally engages the carrier 45, an axle stub shaft 50 on which a wheel 15 is mounted and an arm 51. The arms 51 of the two steering knuckles 48 are tied together by a rod 52. The rod 52 is adjustable in length to align the wheels 15 in parallel planes. The ends of the rod 52 pivotally engage the arms 51 to permit turning of the wheels 15. The rod 52 maintains the wheels 15 parallel as they are turned. A two way hydraulic cylinder 53 is connected between a bracket 54 mounted on the plates 40 and 41 and one of the arms 51 on the two steering knuckles 48. The hydraulic cylinder 53 has a two way piston which extends or retracts, depending upon the end of the cylinder 53 to which hydraulic fluid is applied. By extending or retracting the hydraulic cylinder 53, the wheels 15 are turned to steer the cart 10.

The cart 10 is powered by a small internal combustion engine 58 which drives a hydraulic fluid pump 59. The engine 58 is mounted on a platform 60 which extends from the end of the cart 10 adjacent the dirigible wheels 15. As is discussed in greater detail below, the engine driven pump 59 circulates hydraulic fluid from a reservoir or sump 61 to the hydraulic motors 37 and the steering cylinder 53 and back to the reservoir 61. A battery 62 is shown positioned on a platform 63 adjacent the reservoir 61 and the motor 58. The battery 62 is connected for starting the motor 58. If desired, the battery 62 can be eliminated and the motor 58 can be manually started. A third platform 64 is mounted on brackets 65 extending from the end of the cart 10 adjacent the motor platform 60. The platform 64 is pivotally mounted to swing from a lowered position, as shown, to a raised position wherein the platform 64 is positioned between the brackets 65. A steering wheel 66 and a drive control lever 67 are mounted on the cart truss structure 12 above the platform 64. During operation of the cart 10, an operator may stand on the platform 64 and control the steering wheel 66 and the drive control lever 67. Or, the platform 64 may be retracted and the operator then walks next to the cart 10 as he controls the steering wheel 66 and the drive control lever 67.

Two pairs of tie down brackets 70 are welded to the bottom of the cart bed 11. The brackets 70 are used to tie the cart 10 down to a truck (not shown) used for transporting the cart 10 and the weights 17 to a scale to be tested. In addition, lifting eyes 71 are located within boxes 72 recessed in the flat cart bed 11. The lifting eyes 71 are located on either side of the cart 10 in line with the transverse center of gravity of the cart 10. Therefore, when a crane is attached to the lifting eyes 71, the empty cart 10 will remain substantially horizontal when lifted by such crane. The lifting eyes 71 are used for lifting the cart 10 onto and off of the truck used for transporting the cart 10 to and from scales which are to be tested. In operation, it is typical for such a truck when loaded with the cart 10 and the weights 17 to have a known weight, such as forty thousand pounds. A scale is initially tested by driving the loaded truck onto the scale platform and calibrating for the forty thousand pound weight. The truck is then driven off of the scale platform and the cart 10 is lifted from the truck bed. The weights 17 are selectively placed on the cart 10 for checking the calibration of the scale at various weights ranging from the two thousand pound empty weight of the cart 10 up to twenty thousand pounds when the cart 10 is fully loaded with eighteen of the weights 17.

Figure 6:
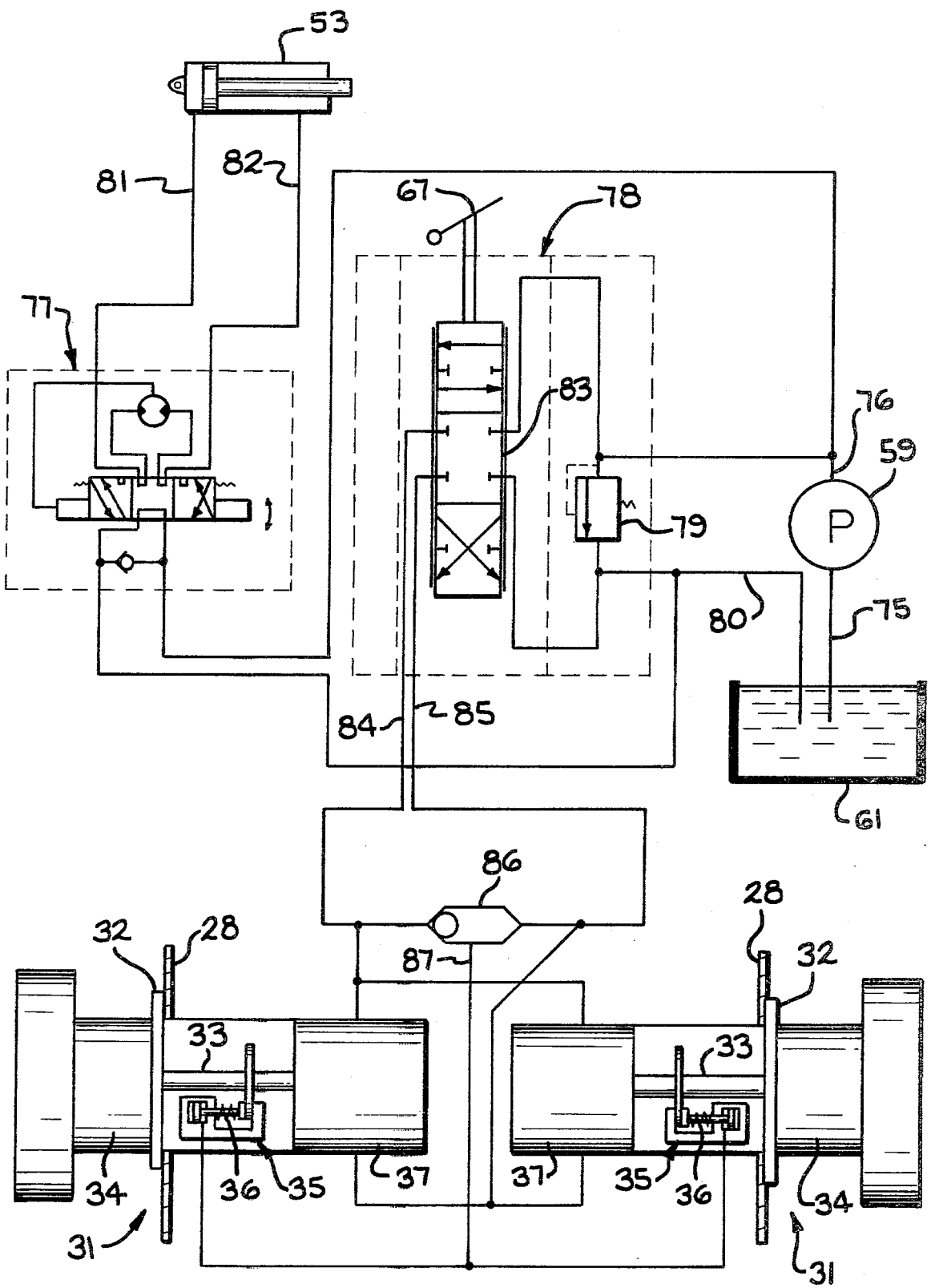
FIG. 6 is a pictorial and schematic diagram of a hydraulic power and control system which includes the steering, braking and drive components for the scale testing cart of the present invention.

Turning now to FIG. 6, a schematic hydraulic circuit diagram is provided for the cart 10. The engine 58 drives the hydraulic pump 59 which is of conventional design, for example, a series YB hydraulic pump manufactured by Webster Electric. The hydraulic pump 59 draws hydraulic fluid from the reservoir or sump 61 along a supply line 75 and discharges it under pressure into a pressurized line 76. The line 76 supplies pressurized fluid to a steering control valve assembly 77 and to a drive control valve assembly 78. A pressure limiting relief valve 79 is connected in parallel with the valve assemblies 77 and 78 between the supply line 76 and a fluid return line 80 which leads back to the sump 61.

The steering control valve assembly 77, which is operably connected to the steering wheel 66, controls the application of hydraulic fluid from the pressurized line 76 over two lines 81 and 82 to the hydraulic steering cylinder 53. As the cylinder 53 is extended by the application of fluid to the line 81 or retracted by the application of fluid to the line 82, fluid flows from the other of the lines 82 or 81 back through the return line 80 to the reservoir 61. The steering control valve 77 is known in the art as an orbital steering valve and may be, for example, the Model UK312 control valve assembly manufactured by Char-Lynn or it may be of other commercially available designs.

The drive control valve assembly 78 includes the lever 67 which is linked to position a ported cylinder 83. Movement of the lever 67 up or down from the neutral position, as shown, moves the cylinder 83 up or down and supplies pressurized hydraulic fluid to one of two hydraulic lines 84 or 85. The other of the lines 85 or 84 is connected through the ported cylinder 83 to the fluid return line 80. The lines 84 and 85 are connected to the inputs and outputs of the two hydraulic motors 37. The motors 37 will be driven either forward or reverse, depending upon the flow direction of the hydraulic fluid through the motors 37. Of course, the speed of the motors 37 will depend upon the flow rate of the hydraulic fluid through the motors 37.

Hydraulic fluid controlled by the valve 78 is supplied under pressure over one of the lines 84 or 85 to drive the motors 37 and also, simultaneously, to release the brakes 35. A two way check or shuttle valve 86 is interposed between the hydraulic lines 84 and 85 and a line 87. The valve 86 senses the hydraulic line 84 or 85 having the lower pressure and closes off that line to prevent a reverse flow which would in turn prevent the buildup of pressure in the line 87 connected behind the spring biased brake pistons 36 and inhibit the release of the brakes 35. The check valve 86 is well known in the hydraulic control art and, for example, may comprise a model MH04P valve manufactured by Racine Hydraulics. Selective application of pressurized hydraulic fluid through the drive valve assembly 78 and the lines 84 and 85 to the gear motors 37 and through the check valve 86 to the brakes 35, releases the brakes 35 and accomplishes either forward or rearward movement of the cart 10.

It will be appreciated by those skilled in the art that various modifications and changes may be made to the above-described embodiment of a scale testing cart without departing from the spirit and the scope of the following claims.

What I claim is:

1. A scale testing cart for positioning scale calibration weights on a platform scale comprising a weight receiving bed having a generally rectangular periphery, a top, a bottom, two sides and two ends, a truss means attached to said weight bed top, said truss means having rails and extending above and completely about said periphery, said truss means defining reinforcement for said weight bed, an axle carrier assembly having two ends, means attaching said carrier assembly to said weight bed bottom adjacent one end of said weight bed to pivot about a horizontal central axis of said cart, a first pair of wheels, steering knuckle means attaching said wheels of said first pair to opposite ends of said carrier assembly, hydraulic steering means for simultaneously pivoting said knuckle means to steer said cart, a second pair of wheels, means rotatably attaching said second wheels to said weight bed bottom adjacent the other end and adjacent said two sides of said weight bed, normally engaged hydraulic braking means connected to said second pair of wheels, hydraulic motor means operatively connected to drive said second pair of wheels and hydraulic means for simultaneously releasing said braking means and powering said motor means to propel said cart.

2. The scale testing cart of claim 1, wherein said truss means comprises a rectangular lower frame welded to said weight bed periphery, a similar rectangular upper rail spaced above said lower frame, four vertical corner posts connecting between said upper rail and lower frame, four vertical struts, one strut connected between said upper rail and lower frame in the center of each side of said truss means; and a separate pair of webs for each side of said truss means extending in each side from said strut adjacent said upper rail to said corner posts adjacent said lower frame.

3. The scale testing cart of claim 2, wherein said upper rail of said truss means is spaced above said lower frame by said corner posts and said struts a sufficient distance to retain at least two stacked layers of the calibration weights on said cart.

4. The scale testing cart of claim 2, and further including motor driven pump means for supplying pressurized hydraulic fluid, manually operably steering valve means for supplying such pressurized fluid to said steering means, and wherein said hydraulic means includes manually operable drive valve means for supplying such pressurized fluid simultaneously to said braking means and to said motor means.

5. The scale testing cart of claim 4, wherein said carrier assembly and said motor means have a predetermined minimum ground clearance, and further including means attaching said motor driven pump means to said truss means to extend above said predetermined minimum ground clearance, an operator supporting platform, means attaching said platform to said truss means to extend above said predetermined minimum ground clearance, and means attaching said steering valve means and said drive valve means to said truss means above said platform and within reach of an operator standing on said platform.

6. The scale testing cart of claim 2, wherein said weight receiving bed include a plurality of spacing dividers, said spacing dividers extending the length of said weight receiving bed such that the calibration weights seat between said spacing dividers in uniform alignment.

7. A scale testing cart for positioning scale calibration weights on a platform scale comprising a weight receiving bed having a generally rectangular periphery, a top, a bottom, two sides, and two ends, a truss means attached to said weight bed top and extending above and completely about said periphery, said truss means including a rectangular lower frame welded to said weight bed periphery, a similar rectangular upper rail spaced above said lower frame, four vertical corner posts connecting between said upper rail and said lower frame, four vertical struts, one strut connected between said upper rail and lower frame in the center of each side of said truss means, and a separate pair of webs for each side of said truss means extending in each side from said strut adjacent said upper rail to said corner posts adjacent said lower frame, said upper rail of said truss means being spaced above said lower frame by said corner posts and said struts a sufficient distance to retain at least two stacked layers of the calibration weights on said cart, an axle carrier assembly having two ends, means attaching said carrier assembly to said weight bed bottom adjacent one end of said weight bed to pivot about a horizontal central axis of said cart, a first pair of wheels, steering knuckle means attaching said wheels of said first pair to opposite ends of said carrier assembly, hydraulic steering means for simultaneously pivoting said knuckle means to steer said cart, a second pair of wheels, means rotatably attaching said second wheels to said weight bed bottom adjacent the other end and adjacent two sides of said weight bed, normally engaged hydraulic braking means connected to said second pair of wheels, hydraulic motor means operatively connected to drive said second pair of wheels and hydraulic means for simultaneously releasing said braking means and powering said motor means to propel said cart, a motor driven hydraulic pump means for supplying pressurized hydraulic fluid to said hydraulic steering means, said hydraulic braking means, and said hydraulic motor means, said carrier assembly and said motor means having a predetermined minimum ground clearance, and further including means attaching said motor driven pump means to said truss means to extend above said predetermined minimum ground clearance, an operator supporting platform, means attaching said platform to said truss means to extend above said predetermined minimum ground clearance, and means attaching said steering valve means and said drive valve means to said truss means above said platform and within reach of an operator standing on said platform.

* * * * *